(12) United States Patent
Stamires et al.

(10) Patent No.: US 6,593,265 B2
(45) Date of Patent: Jul. 15, 2003

(54) PROCESS FOR THE PREPARATION OF ANIONIC CLAY

(75) Inventors: Dennis Stamires, Newport Beach, CA (US); William Jones, Cambridge (GB); Sjoerd Daamen, Amsterdam (NL)

(73) Assignee: Akzo Nobel N.V. (NL)

(*) Notice: Subject to any disclaimer, the term of this patent is extended or adjusted under 35 U.S.C. 154(b) by 0 days.

(21) Appl. No.: 10/071,385

(22) Filed: Feb. 7, 2002

(65) Prior Publication Data

US 2002/0110520 A1 Aug. 15, 2002

Related U.S. Application Data

(60) Provisional application No. 60/267,477, filed on Feb. 9, 2001.

(30) Foreign Application Priority Data

Mar. 5, 2001 (EP) .............................. 01200832

(51) Int. Cl.⁷ .................. B01J 21/00; B01J 29/00; B01J 21/16; C04B 35/03; C04B 33/00
(52) U.S. Cl. .............. 502/73; 502/80; 502/84; 501/118; 501/141
(58) Field of Search ................ 502/63, 73, 80, 502/84, 355, 414, 415, 529; 501/118, 125, 127, 141, 153; 423/600

(56) References Cited

U.S. PATENT DOCUMENTS

| 3,796,792 A | * | 3/1974 | Miyata et al. ............... 423/250 |
| 3,844,979 A | * | 10/1974 | Hickson .................. 252/455 R |
| 3,879,525 A | * | 4/1975 | Miyata et al. ............... 423/277 |
| 4,454,244 A | * | 6/1984 | Woltermann ................ 502/208 |
| 4,458,026 A | * | 7/1984 | Reichle ......................... 502/80 |
| 4,656,156 A | * | 4/1987 | Misra .......................... 502/415 |
| 4,843,168 A | * | 6/1989 | Drezdzon et al. ............ 558/357 |
| 4,866,019 A | * | 9/1989 | van Broekhoven .......... 502/65 |
| 4,946,581 A |   | 8/1990 | van Broekhoven ......... 208/120 |
| 4,952,382 A |   | 8/1990 | van Broekhoven ......... 423/244 |

(List continued on next page.)

FOREIGN PATENT DOCUMENTS

| WO | 99/41195 | 8/1999 | ............. C01F/7/00 |
| WO | 99/41196 | 8/1999 | ............. C01F/7/00 |
| WO | 99/41197 | 8/1999 | ............. C01F/7/00 |
| WO | 99/41198 | 8/1999 | ............. C01F/7/00 |
| WO | 01/12550 A1 | 2/2001 | ............. C01F/7/00 |

OTHER PUBLICATIONS

International Search Report for: PCT/EP02/01233; dated: Oct. 7, 2002.
Catalysis Today,; Hydrotalcite–Type Anionic Clays: Preparation, Properties, and Applications. 11 (1991) pp. 173–301; Cavani et al.

(List continued on next page.)

Primary Examiner—Stanley S. Silverman
Assistant Examiner—Cam N. Nguyen
(74) Attorney, Agent, or Firm—Louis A. Morris

(57) ABSTRACT

A process for preparing a $3R_1$-type crystalline anionic clay comprising the steps of:
a) preparing an aqueous precursor mixture comprising aluminum trihydrate or a thermally treated form thereof and a magnesium source, the magnesium source is milled before use or when present in the precursor mixture,
b) aging the precursor mixture at temperatures in the range 30°–100° C. to obtain the crystalline clay product, and c) optionally shaping the product of step b).

Milling of the magnesium source, either alone or in combination with the (thermally treated) aluminum trihydrate, results in a faster reaction and higher conversion to anionic clay. The resulting anionic clay can be obtained by simply drying the slurry retrieved from the reactor. There is no need for washing or filtering, and a wide range of ratios of Mg/Al in the reaction product is possible.

13 Claims, 1 Drawing Sheet

U.S. PATENT DOCUMENTS

| | | | | |
|---|---|---|---|---|
| 5,075,089 A | * | 12/1991 | Misra et al. | 423/331 |
| 5,153,156 A | * | 10/1992 | Schutz et al. | 502/63 |
| 5,246,899 A | * | 9/1993 | Bhattacharyya | 502/84 |
| 5,507,980 A | * | 4/1996 | Kelkar et al. | 264/15 |
| 5,578,286 A | | 11/1996 | Martin et al. | 423/593 |
| 5,728,364 A | | 3/1998 | Martin et al. | 423/593 |
| 5,728,365 A | | 3/1998 | Martin et al. | 423/593 |
| 5,728,366 A | | 3/1998 | Martin et al. | 423/593 |
| 5,730,951 A | | 3/1998 | Martin et al. | 423/593 |
| 5,776,424 A | | 7/1998 | Martin et al. | 423/593 |
| 6,028,023 A | * | 2/2000 | Vierheilig | 502/84 |
| 6,156,696 A | * | 12/2000 | Albers et al. | 502/339 |
| 6,171,991 B1 | * | 1/2001 | Stamires et al. | 501/141 |
| 6,333,290 B1 | * | 12/2001 | Stamires et al. | 502/80 |
| 6,376,405 B1 | * | 4/2002 | Stamires et al. | 502/73 |
| 6,440,887 B1 | * | 8/2002 | Stamires et al. | 502/80 |

OTHER PUBLICATIONS

*Clays and Clay Minerals*; Polytype Diversity of the Hydrotalcite–Like Minerals . . . vol. 41 No. 5 pp. 551–557 (1993) Bookin et al.

*Clays and Clay Minerals*; Polytype Diversity of the Hydrotalcite–Like Minerals . . . vol. 41 No. 5 pp. 558–564 (1993) Bookin et al.

Anionic Clays: Trends in Pillaring Chemistry, Synthesis in Microporous Solids; 2 (1992) pp. 108–169; Roy et al.

Helv. Chim. Acta, 25, (1942) pp. 106–137; Von Feitknecht.

Helv. Chim. Acta, 25, (1942) 555–569; Von Feitknecht.

*Journal of American Ceramic Society*; Studies on 4CaO—$Al_2 O_3.13H_2O$ and the Related Natural Mineral Hydrocalumite. (1959) vol. 42 No. 3; pp. 121–126; Buttler et al.

*Chemistry Letters*; Synthesis of New Hydrotalcite–Like Compounds and Their Physico–Chemical Properties. Miyata et al.; pp. 843–848 (1973).

*Clays and Clay Minerals*; The Syntheses of Hydrotalcite–Like Compounds and Their Structures and Physico–Chemical Properties–I: The Systems . . . ; Miyata et al. vol. 23 (1975) pp. 369–375.

*Clays and Clay Minerals*; Physico–Chemical Properties of Synthetic Hydrotalcites in Relation to Composition. Miyata et al.; vol. 28, No. 1, (1980) pp. 50–56.

*Clays and Clay Minerals*; Syntheses of Disordered and Al–Rich Hydrotalcite–Like Compounds. Pausch et al.; vol. 34 No. 5; (1986) pp. 507–510.

*Materials Chemistry and Physics*, Textural Properties of Hydrotalcite–Like Compounds . . . Ulibarri et al. vol. 14 (1986) pp. 569–579.

European Search Report, for EP 01 20 0833 dated: Jul. 9, 2001.

* cited by examiner

PROCESS FOR THE PREPARATION OF ANIONIC CLAY

CROSS REFERENCE TO RELATED APPLICATIONS

This application claims priority from U.S. patent application Ser. No. 60/267,477, filed Feb. 9, 2001, and European Patent Application No. 01200832.2, filed Mar. 5, 2001, both of which are incorporated herein in their entirety.

BACKGROUND OF THE INVENTION

1. Field of the Invention

This invention relates to a process for the preparation of Mg—Al anionic clays.

2. Prior Art

Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein hydroxyl is the predominant anion present.

In hydrotalcite-like anionic clays the brucite-like main layers are built up of octahedra alternating with interlayers in which water molecules and anions, more particularly carbonate ions, are distributed. The interlayers may contain anions such as $NO_3^-$, $OH^-$, $Cl^-$, $Br^{31}$, $I^{31}$, $SO_4^{2-}$, $SiO_3^{2-}$, $CrO_4^{2-}$, $BO_3^{2-}$, $MnO_{4-}$, $HGaO_3^{2-}$, $HVO_4^{2-}$, $ClO_4^{31}$, $BO_3^{2-}$, pillaring anions such as $V_{10}O_{28}^{-6}$ and $MO_7O_{24}^{6-}$, monocarboxylates such as acetate, dicarboxylates such as oxalate, and alkyl sulfonates such as laurylsulfonate.

It should be noted that a variety of terms are used to describe the material that is referred to in this specification as an anionic clay. Hydrotalcite-like and layered double hydroxide is interchangeably used by those skilled in the art. In this specification we refer to these materials as anionic clays, comprising within that term hydrotalcite-like and layered double hydroxide materials. The anionic clays referred to in this document are anionic clays having the conventional $3R_1$ stacking. These clays have regular well-formed layers of platelets that are arranged in the bookstack form. A more detailed description of this and other types of anionic clays can be found in the publications in *Clay and Clay Minerals*, Vol. 41, No. 5, pp. 551–557 and pp. 558–564 of Bookin and Drits.

The preparation of anionic clays has been described in many prior art publications. Two major reviews of anionic clay chemistry were published in which the synthesis methods available for anionic clay synthesis have been summarised: F. Cavani et al "Hydrotalcite-type anionic clays: Preparation, Properties and Applications," *Catalysis Today*", 11 (1991) Elsevier Science Publishers B. V. Amsterdam; and J P Besse and others "*Anionic clays: trends in pillary chemistry, its synthesis and microporous solids*" (1992), 2, 108, editors: M. I. Occelli, H. E. Robson, Van Nostrand Reinhold, N.Y.

In these reviews the authors state that a characteristic of anionic clays is that mild calcination at 500° C. results in the formation of a disordered MgO-like product. Said disordered MgO-like product is distinguishable from spinel (which results upon severe calcination) and from anionic clays. In this specification we refer to said disordered MgO-like materials as Mg—Al solid solutions. Furthermore, these Mg—Al solid solutions contain a well-known memory effect whereby the exposure to water of such calcined materials results in the reformation of the anionic clay structure.

Two types of anionic clay preparation are described in these reviews. The most conventional method is co-precipitation (in Besse this method is called the salt-base method) of a soluble divalent metal salt and a soluble trivalent metal salt, optionally followed by hydrothermal treatment or aging to increase the crystallite size. The second method is the salt-oxide method in which a divalent metal oxide is reacted at atmospheric pressure with a soluble trivalent metal salt, followed by aging under atmospheric pressure. This method has only been described for the use of ZnO and CuO in combination with soluble trivalent metal salts.

For work on anionic clays, reference is further made to the following articles:

*Helv. Chim. Acta,* 25, 106–137 and 555–569 (1942)
*J. Am. Ceram. Soc.,* 42, no. 3,121 (1959)
*Chemistry Letters (Japan),* 843 (1973)
*Clays and Clay Minerals,* 23, 369 (1975)
*Clays and Clay Minerals,* 28, 50 (1980)
*Clays and Clay Minerals,* 34, 507 (1996)
*Materials Chemistry and Physics,* 14, 569 (1986).

In addition there is an extensive amount of patent literature on the use of anionic clays and processes for their preparation.

Several patent applications relating to the production of anionic clays from inexpensive raw materials have been published. These materials include magnesium oxide and aluminum trihydrate.

WO 99/41198 relates to the production of anionic clay from two types of aluminum compounds and a magnesium source. One of the aluminum sources is aluminum trihydrate or a thermally treated form thereof.

WO 99/41196 discloses the preparation of anionic clays with acetate as the charge balancing anion from magnesium acetate, another magnesium source and aluminum trihydrate.

In WO 99/41195 a continuous process is described for the production of a Mg—Al anionic clay from a Mg source and aluminum trihydrate.

WO 99/41197 discloses the production of an anionic clay-containing composition comprising a Mg—Al anionic clay and unreacted aluminum trihydrate or a thermally treated form thereof. Milling of the magnesium source is not mentioned in this document.

Several patents in the name of Alcoa describe the synthesis of hydrotalcites, i.e. anionic clays, out of magnesium oxide and a transition alumina, in a batch-wise manner and under non-hydrothermal conditions: U.S. Pat. Nos. 5,728,364, 5,728,365, 5,728,366, 5,730,951, 5,776,424 and 5,578,286. Comparative Examples 1–3 presented in these patents indicate that upon using aluminum trihydrate as aluminum source, anionic clays are not formed.

There are many applications of anionic clays. These include but are not restricted to: catalysts, adsorbents, drilling muds, catalyst supports and carriers, extenders and applications in the medical field. In particular Van Broekhoven (U.S. Pat. Nos. 4,956,581 and 4,952,382) has described their use in $SO_x$ abatement chemistry.

SUMMARY OF THE INVENTION

In one embodiment, this invention relates to a process for preparing a $3R_1$-type crystalline anionic clay comprising the steps of:

a) preparing an aqueous precursor mixture comprising aluminum trihydrate or a thermally treated form thereof and a magnesium source, the magnesium source being milled before use and/or when present in the precursor mixture, b) aging the precursor mixture at a temperature in the range of 30°–100° C. to obtain the crystalline clay product, and c) optionally shaping the product of b).

Other embodiments of the invention relate to precursor mixture composition, process conditions and additional process steps.

DETAILED DESCRIPTION OF THE INVENTION

Figure 1:
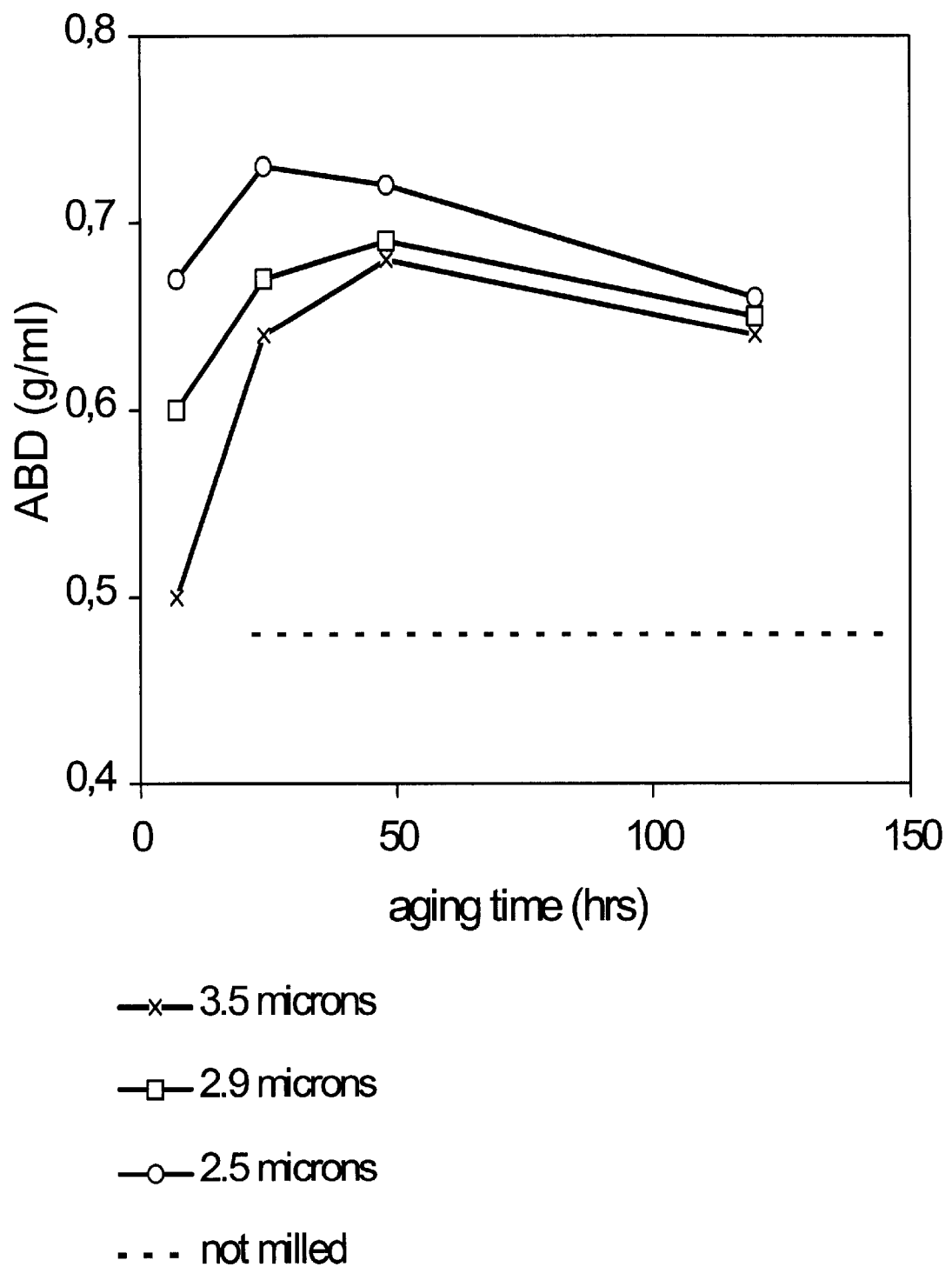
FIG. 1 shows the effect of the particle size of the starting materials on the Apparent Bulk Density (ABD) of the reaction products as a function of the aging time.

In this specification the tern 'milling' is defined as any method that results in reduction of the particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as 'milling'.

By milling the magnesium source before performing aging step b) it is possible, in contrast to the Comparative Examples of the above-mentioned Alcoa patents, to prepare an anionic clay from inexpensive aluminum trihydrate at low temperature and ambient pressure in a simple process. Moreover, the milling step results in a faster reaction and higher conversion to anionic clay in comparison with the non-hydrothermal process disclosed in WO 99/41197.

Without being bound by theory, we believe that milling of the magnesium source prior to aging creates a fresh and reactive surface. On MgO, for instance, a brucite layer is formed upon contact with air. By milling MgO before reaction, a fresh MgO surface is created.

Process step b) involves aging the precursor mixture with or without stirring in aqueous suspension, at temperatures in the range 30°–100° C. at atmospheric pressure. The process can be operated in standard industrial equipment.

This invention involves the use of alumina trihydrate (such as gibbsite, bayerite or nordstrandite) or thermally treated forms thereof. The reaction results in the direct formation of an anionic clay that can be obtained by simply drying the slurry retrieved from the reactor. There is no need for washing or filtering, and a wide range of ratios of Mg/Al in the reaction product is possible.

Powder X-ray diffraction (PXRD) indicates that the product obtained by this process is comparable to $3R_1$-type anionic clays made by standard methods. The physical and chemical properties of the product are also comparable to those of anionic clays made by conventional methods. The overall process of this invention is very flexible, economical and environmental-friendly. Moreover, the process according to the invention enables the preparation of a wide variety of anionic clays. For instance, anionic clays with carbonate or hydroxide as interlayer anions can be prepared.

This invention relates to a process for the preparation of a $3R_1$-type anionic clay wherein aluminum trihydrate or a thermally treated-form thereof and a magnesium source are fed to a reactor and aged in aqueous suspension to obtain an anionic clay. The magnesium source, which is insoluble in the reaction medium, is milled before use or when present in the precursor mixture. Reaction between the Mg source and aluminum trihydrate or its thermally treated form results in the direct formation of an anionic clay. This reaction takes place during aging at a temperature in the range of 30°–100° C. and at ambient pressure.

In the method according to the invention carbonate, hydroxyl, other anions or mixtures thereof, either provided within the reaction medium (for example by feeding a soluble salt to the reactor), or absorbed from the atmosphere during synthesis (e.g. carbonate), are incorporated into the interlayer region as the necessary charge-balancing anion.

Anionic clays prepared by this method exhibit the well known properties and X characteristics (e.g. chemical analysis, powder X-ray diffraction pattern, FTIR, thermal decomposition characteristics, surface area, pore volume, and pore size distribution) usually associated with a conventional $3R_1$ anionic clay prepared by customary and previously disclosed methods.

Upon being heated anionic clays generally form Mg—Al solid solutions, and at higher temperatures spinels. When used as a catalyst, an adsorbent (for instance a $SO_x$ adsorbent for catalytic cracking reactions), or a catalyst support, the anionic clay is usually heated during preparation and/or use (for instance in an FCC unit) and is thus in the Mg—Al solid solution form.

Therefore, the present invention is also directed to a process wherein an anionic clay prepared by the process according to the invention is heat-treated at a temperature between 300° and 1200° C. to form a Mg—Al-containing solid solution and/or spinel. The so formed solid solution can be rehydrated to form an anionic clay again. The so prepared anionic clay has a layered structure corresponding to the general formula

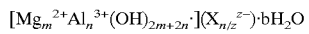

$$[Mg_m^{2+}Al_n^{3+}(OH)_{2m+2n}](X_{n/z}^{z-})\cdot bH_2O$$

wherein m and n have a value such that m/n=1 to 10, preferably 1 to 6, and b has a value in the range from 0 to 10, generally a value of 2 to 6 and often a value of about 4. X may be $CO_3^-$, $OH^-$ or any other anion normally present in the interlayers of anionic clays. It is more preferred that m/n should have a value of 2 to 4, more particularly a value close to 3.

Since the process according to the invention does not require washing of the product or filtering, there are no filtrate wastes, making the process particularly environmental-friendly and more suited to the environmental constraints that are increasingly imposed on commercial operations. To form shaped bodies, the product can be spray-dried directly to form microspheres or can be extruded.

Aluminum Trihydrate

In the present invention aluminum trihydrate includes crystalline aluminum trihydrate (ATH), for example gibbsites provided by Reynolds Aluminum Company RH-20® or JM Huber Micral® grades. Also BOC (Bauxite Ore Concentrate), bayerite and nordstrandite are suitable aluminum trihydrates. BOC is the cheapest alumina source. The alumina trihydrate is preferred to have a particle size ranging from 1 to 150 µm, more preferably smaller than 20 µm.

In another embodiment of the invention thermally treated forms of aluminum trihydrate are used. Combinations of aluminum trihydrate and thermally treated forms of aluminum trihydrate can also be used. The calcined aluminum trihydrate is readily obtained by thermally treating aluminum trihydrate (gibbsite) at a temperature above 100° C., preferably ranging from 100° to 800° C., for a period of 15 minutes to 24 hours. In any event, the calcination temperature and time for obtaining calcined aluminum trihydrate should be sufficient to cause a measurable increase of the surface area compared to the surface area of the gibbsite as produced by the Bayer process which is generally between 30 and 50 m$^2$/g. It should be noted that within the context of this invention flash calcined alumina is also considered to be a thermally treated form of aluminum trihydrate, although generally it is considered a very specific alumina. Flash calcined alumina is obtained by treating aluminum trihydrate at temperatures between 800°–1000° C. for very short periods of time in special industrial equipment, as is described in U.S. Pat. Nos. 4,051,072 and 3,222,129. Combinations of various thermally treated forms of aluminum trihydrate can also be used.

Preferably the aluminum trihydrate or its thermally treated form is added to the reactor in the form of a slurry. In particular we emphasise that there is no need to use a peptisable alumina source (gibbsite is not peptisable) and as a result no need to add either mineral or organic acid to vary the pH of the mixture. In the process according to our invention other aluminum sources beside aluminum trihydrate or its thermally treated forms may be added to the aqueous suspension such as oxides and hydroxides of aluminum (e.g. sols, gels, pseudo-boehmite, micro-crystalline boehmite), aluminum salts such as aluminum nitrate, aluminum chloride, aluminum chlorohydrate and sodium aluminate. The other aluminum sources may be soluble or insoluble in water and may be added to the aluminum trihydrate and/or its thermally treated form or may be added to the aqueous suspension separately as a solid, a solution, or a suspension.

Magnesium Source

Mg-bearing sources which may be used include MgO, Mg(OH)$_2$, hydromagnesite, magnesium carbonate, magnesium hydroxycarbonate, magnesium bicarbonate, dolomite and sepiolite. Also combinations of Mg sources may be used. Suitable MgO can be obtained from, for instance, Nedmag® and Martin Marietta®.

The magnesium source may be fed to the reactor as a solid or, preferably, as a slurry. The magnesium source may also be combined with aluminum trihydrate or its thermally treated form before it is fed to the reactor.

Milling

The magnesium source is milled before aging step b). The magnesium source is either milled before use or when present in the precursor mixture. Preferably, it is milled when present in the precursor mixture. In that case, both the magnesium source and the (thermally treated) aluminum trihydrate are wet milled. If the magnesium source, and optionally also the aluminum source, is milled before use, dry milling can be applied. If both sources are milled before use they can be milled individually or together.

In another embodiment the magnesium source and optionally the (thermally treated) aluminum trihydrate are first milled individually, and subsequently (wet) milled together.

When wet milling is used, the slurry containing both aluminum trihydrate or its thermally treated form and the magnesium source may be wet milled for about 1–30 minutes at room temperature, for instance in a ball mill, a bead mill, a sand mill, a colloid mill, a high shear mixer, or by using ultrasound. The preferred average size of the magnesium source particles obtained after milling is about 0.5–5 microns, more preferably about 1–30 microns. The temperature during milling may be ambient or higher. Higher temperatures may for instance result naturally from the milling process or may be generated by external heating sources. Preferably, the temperature during milling ranges from 20 to 90° C., more preferably from 30 to 50°C.

Conditions

In a reactor, an aqueous slurry containing aluminum trihydrate or its thermally treated form and a magnesium source which is either milled before use or when present in the slurry, is aged in aqueous suspension to obtain an anionic clay. The reactor may be equipped with stirrers or baffles to ensure homogeneous mixing of the reactants. The reaction can take place with or without stirring and at temperatures in the range 30–100° C. at atmospheric pressure. The reactor may be heated by any heating source such as a furnace, microwave, infrared sources, heating jackets (either electrical or with a heating fluid), and lamps. Because of its simplicity, this process is particularly suitable to be carried out in a continuous mode.

The aqueous suspension in the reactor may be obtained by either adding slurries of the starting materials, either combined or separate, to the reactor or adding the magnesium source to a slurry of aluminum trihydrate or vice versa and adding the resulting slurry to the reactor. It is possible to treat, for instance, aluminum trihydrate slurry at elevated temperature and then add either the magnesium source per se, or add the magnesium source in a slurry or solution either to the reactor or the aluminum trihydrate slurry. The solids content of the slurry is preferably smaller than 40 wt %, more preferably between 1 and 20 wt %.

There is no need to wash or filter the product, as unwanted ions (e.g. sodium, chloride, sulfate, phosphate) are absent in the product.

If desired, organic or inorganic acids and bases, for example for control of the pH, may be fed to the reactor or added to either the magnesium source or (thermally treated) aluminum trihydrate before they are fed to the reactor. The pH can have any value between 1 and 14. Preferably, the pH is higher than 7. The pH may be adjusted in one or more steps using one or more types of acids or bases. An example of a preferred base is an ammonium base, because upon drying no deleterious cations remain in the anionic clay.

The product formed may optionally be calcined at temperatures between 300° and 1200° C., preferably between 300° and 800° C. and most preferred between 300° and 600° C. This calcination is conducted for 15 minutes to 24 hours, preferably 1–12 hours and most preferred 2–6 hours. By this treatment a Mg—Al-containing solid solution and/or spinel can be formed.

The so formed solid solution can be rehydrated to form an anionic clay again. This rehydration can be performed by contacting the solid solution with water for 1–24 hours at thermal or hydrothermal conditions, preferably at temperatures ranging from 65°–85° C. Preferably, the slurry is stirred and has a solids content ranging from about 10 to 50 wt %. During rehydration anions can be present, such as carbonate, bicarbonate, nitrate, chloride, sulfate, bisulfate, vanadates, tungstates, borates, phosphates, and pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$, $HBO_4^{2-}$, $HGaO_3^{2-}$, $CrO_4^{2-}$, and Keggin-ions, formate, acetate and mixtures thereof.

The present invention is therefore also directed to a process wherein an anionic clay prepared by the process according to the invention is heat-treated at a temperature between 300° and 1200° C. to form a Mg—Al-containing solid solution and/or spinel, optionally followed by rehydration to an anionic clay.

If desired, the anionic clay prepared by the process according to the invention may be subjected to ion-exchange. Upon ion-exchange the interlayer charge-balancing anions are replaced with other anions. Examples of suitable anions are carbonate, bicarbonate, nitrate, chloride, sulfate, bisulfate, vanadates, tungstates, borates, phosphates, and pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$, $HBO_4^{2-}$, $HGaO_3^{2-}$, $CrO_4^{2-}$, and Keggin-ions, formate, acetate and mixtures thereof. The ion-exchange can be conducted before or after drying the anionic clay formed in the slurry.

The process of the invention provides wide flexibility in preparing products with a wide range of Mg/Al ratios. The Mg/Al ratio can vary from 0.1 to 10, preferably from 1 to 6, more preferred from 2 to 4, and especially preferred close to 3.

For some applications it is desirable to have additives, both metal compounds and non-metal compounds, comprising rare earth metals (for example La and Ce), Si, P, B, group VI, group VIII, alkaline earth (for instance Ca and Ba) and/or transition metals (for example Mn, Fe, Ti, Zr, Cu, Ni, Zn, Mo, W, V, Sn), present. The additives can be deposited on the anionic clay prepared according to the invention process or they can be added either to the magnesium source or to the aluminum trihydrate or its thermally treated form which are added to the reactor or added to the reactor separately. Suitable sources of metal compounds and non-metal compounds are oxides, hydroxides, carbonates, hydroxycarbonates, halides or any other salt such as chlorides, nitrates, sulfates, and phosphates. Such metals (additives) may be present within the sheets of the anionic clay or on the external surface of the clay crystallites. They may also form a separate phase, e.g. as oxides or hydroxides.

If an excess of aluminum trihydrate or a thermally treated form thereof is used a composition is prepared which contains anionic clay and also unreacted (meaning: not reacted to anionic clay) aluminum trihydrate or its thermally treated form. The unreacted (thermally treated) aluminum trihydrate may be present in these compositions as such, or in the form of another alumina, e.g. boehmite.

On the other hand, magnesium sources may be used in excess to obtain a composition containing anionic clay and a magnesium compound, usually in the form of an oxide or hydroxide. It is even possible to prepare compositions containing anionic clay, unreacted aluminum trihydrate (or its thermally treated form) and a magnesium compound, e.g. compositions comprising anionic clay, boehmite, and brucite, by controlling the process conditions. In those compositions the anionic clay, the magnesium compound and/or the unreacted aluminum trihydrate (or its thermally treated form) are intimately mixed, rather than present as separate phases such as in physically mixed mixtures of these components.

These compositions appear to be highly suitable for use as an additive or as a matrix for catalysts for hydrocarbon conversion, e.g. FCC and HPC. They are especially suitable for sulfur removal from the gasoline and diesel fraction in FCC, SOX and NOX removal in FCC, and as a metal trap.

The resulting anionic clays and anionic clay-containing compositions may optionally be shaped to form shaped bodies. If compositions containing anionic clay and unreacted aluminum trihydrate are formed, the unreacted aluminum compound (i.e aluminum trihydrate or a thermally treated form thereof) can serve as a binder and also create porosity in the shaped bodies.

Suitable shaping methods include spray-drying, pelletizing, extrusion (optionally combined with kneading), beading, or any other conventional shaping method used in the catalyst and absorbent fields or combinations thereof. The amount of liquid present in the slurry used for shaping should be adapted to the specific shaping step to be conducted. It might be advisable to partially remove the liquid used in the slurry and/or add an additional or another liquid, and/or change the pH of the precursor mixture to make the slurry gellable and thus suitable for shaping.

Catalyst compositions or catalysts additive compositions which can suitably be used as FCC additives for SOx and NOx reduction, for sulfur reduction in gasoline and diesel and for hydroprocessing applications, including HDN and HDS applications, can be obtained by preparing shaped bodies comprising anionic clay and various catalyst components or precursors of the latter. Examples of such components or component precursors are alumina, peptised alumina, silica, silica-alumina, alumina chlorohydrol, metal phosphates, natural and synthetic clays, ion-exchanged and stabilised Y type zeolites, and ZSM type zeolites.

These components can be added to the precursor mixture used for shaping. Alternatively, the anionic clay-containing shaped bodies can be milled and the milled product can subsequently be mixed with a slurry containing one or more of said catalyst components. The resulting slurry can then be shaped as desired.

EXAMPLES

The binding properties, which are used in the following Examples as a measure of the amount of anionic clay formed, were quantified by the attrition index (A.I.) and the apparent bulk density (ABD), i.e. the mass of a certain volume of material. Both parameters indicate the strength of the particle. The attrition index is measured by flowing particles at high speed through a perforated disc during 3 hours and measuring the amount of fines (<30 $\mu$m) formed. Both the A.I. and ABD measurements were performed after calcination at 600° C.

With increasing particle strength the A.I. will decrease, whereas the ABD will increase.

The formation of anionic clay was checked by X-ray diffraction (XRD) measurements. With Cu—K-alpha radiation Mg—Al anionic clays shows peaks at 11.69°, 23.46°, and 34.95° 2-theta. The aluminum trihydrate used shows peaks at 80.2° and 20.3° 2-theta.

Example 1

A slurry of 4.69 kg MgO (Zolitho® ex-Martin Marietta), 4.4 kg ATH (the Mill®), and 50.9 kg water was prepared in a 100 L reactor. The solids content of the slurry was 12.5 wt. %. Portions of the slurry were each treated in a different manner:

milled in a pilot plant bead mill to obtain a mean particle diameter ($d_{50}$) of 2.5 microns, miled in a pilot plant bead mill to obtain a mean particle diameter ($d_{50}$) of 2.9 microns, milled in a pilot plant bead mill to obtain a mean particle diameter ($d_{50}$) of 3.5 microns, or not milled.

The four resulting slurries were aged at 30° C. for different periods of time in vessels of 20 L. Subsequently, the slurries were spray-dried under standard spray-drying conditions.

The ABD of the resulting products was measured. FIG. 1 presents the results as a function of the aging time and the particle size. If no reaction took place and, therefore, no anionic clay was formed, only a physical mixture of MgO and ATH would have been spray-dried, the spray-dried particles would fall apart, and no ABD could have been measured.

FIG. 1 shows that by decreasing the mean particle diameter higher ABD-values and, therefore, higher amounts of anionic clay are obtained at shorter aging times.

Example 2

A slurry of MgO and ATH was prepared by mixing 7.04 kg MgO, 6.7 kg ATH, and 76.4 kg water in a 100 L reactor. The solids content of the slurry was 12.5 wt. %. The slurry was milled in a pilot plant bead mill with a flow rate of 1.0 kg/min. This resulted in a mean particle diameter ($d_{50}$) of 2.8 microns. After 6 hrs of aging at a temperature of 80° C. and a pH 11.8, a cerium nitrate solution was added to the slurry (11 wt. % CeO based on dry-solids base). The slurry was finally spray-dried.

The ABD of the spray-dried product was 0.60 g/ml. The XRD-pattern indicates the formation of anionic clay by the presence of diffraction lines at around 11.5°, 23.5°, and 35.0° 2-theta.

Example 3

A slurry was prepared by mixing 7.04 kg of MgO with a $d_{50}$ of 9 microns, 6.7 kg of ATH with a $d_{50}$ of 6 microns, and 76.4 kg water in a 100 L reactor. The solids content of this slurry was 12.5 wt. %.

The slurry was milled in a pilot plant bead mill with a flow rate of 0.5 kg/min. The $d_{50}$ of the resulting particles was 2.2 microns. After 6 hrs of aging at 35° C. and a pH of 11.8 a cerium nitrate solution was added to the slurry (11 wt. % CeO based on dry-solids base). The slurry was finally spray-dried.
The ABD of the spray-dried product was 0.75 g/ml. The XRD-pattern indicates the formation of anionic clay by the presence of diffraction lines at around 11.5°, 23.5°, and 35.0° 2-theta.

Comparative Example A

A slurry was prepared containing 1.11 kg as received MgO (ex Martin Marietta®), 1.04 kg aluminum trihydrate (ex Alcoa®) and 12.85 kg de-ionised water. No milling-step was conducted. The solids content of the slurry was 15 wt %. The slurry was aged at 30° C. for 24 hours and finally spray-dried. The A.I. had a value of 30.9; the ABD was 0.41 g/ml. An A.I. value of 30.9 means that the particles disintegrated.

Example 4

Aluminum trihydrate (5.91 kg, ex Alcoa®) was slurried in 30 kg de-ionised water. 6.46 kg MgO (ex Martin Mariefta®) was added under vigorous stirring. The solids content of the slurry was 23 wt %. The slurry was milled in an SL Dynomill with 0.8 mm Ti beads at 1.25 kg/min. The temperature of the slurry directly after milling was 39°C. Milling resulted in the following average particle diameter distribution:

D(0.1)=0.80 µm

D(0.5)=3.27 µm

D(0.9)=10.22 µm

The slurry was diluted to a solids content of 15 wt %. The slurry was aged for 24 hours. During aging the temperature increased from 34° to 42° C. After aging, the slurry appeared as a soft cake which changed into a fluid under soft pressure. The resulting material was finally spray-dried. X-ray diffraction confirmed the presence of anionic clay in the material, with a main reflection close to 11° 2-theta.

The spray dried product had an A.I. value of 3; the ABD was 0.71 g/ml. If these values are compared with those of Comparative Example A it is clear that the particles of this Example 4 had significantly improved binding properties and increased amounts of anionic clay.

Example 5

A sample of as-received MgO was slurried in water with low shear mixing. Gibbsite was added to the slurry in such an amount that the Mg/Al molar ratio in the slurry was 2.3. This slurry was milled by high shear mixing for 30 minutes. The pH of the slurry was close to 10. The resulting mixture was aged at 85° C. for 4 hours. PXRD showed the formation of anionic clay.

Comparative Example B

Example 5 was repeated, but now the combined MgO/gibbsite-containing slurry was not mixed with high shear. PXRD revealed the presence of unacceptably large amounts of unreacted gibbsite.

Example 6

As-received MgO (45.44 g) was slurried in 106 g de-ionised water. The slurry contained 30.0 wt % solids. This slurry was high shear mixed in a Waring blender for 30 minutes.

Gibbsite (38.74 g) was slurried in 86 g de-ionised water with slow, non-shear mixing. This slurry had a solids content of 20.0 wt %. The gibbsite- and the MgO-containing slurries were combined with 193 g de-ionised water and the resulting slurry (solids content of this slurry: 15 wt %) was high shear mixed in a Waring blender for 30 minutes. The pH of the final slurry was 10.66; the temperature was 70° C. This slurry was aged at 85° C. for 4 hours and dried at 110° C. PXRD revealed the formation of anionic clay with a small amount of gibbsite remaining unreacted.

Example 7

Example 6 was repeated, but now the MgO-containing slurry was non-shear mixed. The pH of the MgO— and gibbsite-containing slurry was 10.34; the temperature 82° C. PXRD revealed the presence of a substantially larger amount of unreacted gibbsite compared to Example 6.

What is claimed is:

1. A process for the preparation of a $3R_1$-type crystalline anionic clay comprising the steps of:
   a) preparing an aqueous precursor mixture comprising aluminum trihydrate or a thermally treated form thereof and a magnesium source, the magnesium source is milled before use and/or when present in the precursor mixture, and
   b) aging the precursor mixture at a temperature in the range of 30°–100° C. to obtain the crystalline clay product.

2. The process of claim 1 wherein both the magnesium source and the aluminum trihydrate or a thermally treated form thereof are milled before use.

3. The process of claim 1 wherein the magnesium source is wet milled together with the aluminum trihydrate or a thermally treated form thereof when present in the precursor mixture.

4. The process of claim 3 wherein milling is performed in a ball mill, a colloid mill, a bead mill, a sand mill or under high shear mixing.

5. The process of claim 1 wherein the magnesium source is selected from the group consisting of MgO, Mg(OH)$_2$, MgCO$_3$, and hydromagnesite.

6. The process of claim 1 wherein beside aluminum trihydrate or a thermally treated form thereof other aluminum sources are present in the precursor mixture.

7. The process of claim 1 wherein additives are present in the precursor mixture.

8. The process of claim 1 wherein the product obtained is shaped.

9. The process of claim 1 wherein the anionic clay is subjected to an ion-exchange treatment.

10. The process of claim 1 wherein additives are deposited on the anionic clay.

11. The process of claim 1 which is conducted in a continuous mode.

12. A process for the preparation of an Al—Mg solid solution and/or spinel, wherein an anionic clay obtained by the process of claim 1 is subjected to a heat-treatment at a temperature between 300° and 1200° C.

13. A process for the preparation of anionic clays, wherein the Al—Mg containing solid solution obtained by the process of claim 12 is rehydrated to form an anionic clay.

* * * * *